United States Patent
Wen et al.

(10) Patent No.: US 7,894,334 B2
(45) Date of Patent: Feb. 22, 2011

(54) HIERARCHICAL REDUNDANCY FOR A DISTRIBUTED CONTROL PLANE

(75) Inventors: Renhua Wen, San Ramon, CA (US);
Alfred C. Lindem, III, Cary, NC (US);
Anand Oswal, Sunnyvale, CA (US);
Sachin Desai, Cupertino, CA (US);
Chandru Sargor, Sunnyvale, CA (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 130 days.

(21) Appl. No.: 12/192,674

(22) Filed: Aug. 15, 2008

(65) Prior Publication Data

US 2010/0039932 A1 Feb. 18, 2010

(51) Int. Cl.
*H04L 1/00* (2006.01)
(52) U.S. Cl. ...................................... 370/217
(58) Field of Classification Search .................. 370/254, 370/217, 238, 419; 709/203, 232
See application file for complete search history.

(56) References Cited

U.S. PATENT DOCUMENTS

| | | | |
|---|---|---|---|
| 6,983,294 B2 | 1/2006 | Jones | |
| 7,263,597 B2 | 8/2007 | Everdell | |
| 7,453,797 B2 | 11/2008 | Deval et al. | |
| 7,471,676 B2 | 12/2008 | Wybenga et al. | |
| 2003/0126195 A1* | 7/2003 | Reynolds et al. | 709/203 |
| 2003/0128668 A1* | 7/2003 | Yavatkar et al. | 370/238 |
| 2005/0108416 A1* | 5/2005 | Khosravi et al. | 709/232 |
| 2006/0072480 A1* | 4/2006 | Deval et al. | 370/254 |
| 2007/0211742 A1* | 9/2007 | Trisno et al. | 370/419 |

OTHER PUBLICATIONS

Nguyen et al., "Toward a Distributed Control Plane Architecture for Next Generation Routers", Proceedings of the Fourth European Conference on Universal Multiservice Networks (ECUMN'07), IEEE 2007, 10 pages.
Office Action for U.S. Appl. No. 12/192,566, dated Apr. 27, 2010, 10 pages.

* cited by examiner

*Primary Examiner*—Albert T Chou
(74) *Attorney, Agent, or Firm*—Blakely, Sokoloff, Taylor & Zafman LLP (57) ABSTRACT

A method and apparatus for hierarchical redundancy for a distributed control plane. In one embodiment of the invention, control plane processes are distributed among a plurality of processing entities including an active primary control processing entity and multiple secondary processing entities. Each of the secondary processing entities performs a dual role; an active role and a standby role. An application redundancy manager (ARM) instantiated on the active primary control processing entity manages the redundancy services for the secondary processing entities. For each secondary processing entity, the ARM selects one of the secondary processing entities to act as a backup for another one of the secondary processing entities. Upon a failure of one of the secondary processing entities, the ARM causes the secondary processing entity backing up the failed secondary processing entity to transition its standby role to an active role regarding the services provided by the failed secondary processing entity.

19 Claims, 9 Drawing Sheets

ARC INFORMATION STORE
218

| PROCESSING ENTITY ID 410 | ACTIVE SESSIONS 415 | STANDBY SESSIONS 420 | SYNC MESSAGES SENT 425 | SYNC MESSAGES RECEIVED 430 |
|---|---|---|---|---|

FIG. 4A

REDUNDANCY INFORMATION STORE
216

| PROCESSING ENTITY ID 450 | BACKED UP BY PROCESSING ENTITY 455 | BACKING UP PROCESSING ENTITY 460 |
|---|---|---|

ID
HIERARCHICAL REDUNDANCY FOR A DISTRIBUTED CONTROL PLANE

BACKGROUND

1. Field

Embodiments of the invention relate to the field of networking; and more specifically, to hierarchical redundancy for a distributed control plane of a network element.

2. Background

A network element (e.g., router, switch, bridge, combination router/switch/bridge, etc.) is a piece of networking equipment, including hardware and software, which communicatively interconnects other equipment on the network (e.g., other network elements, computer end stations, etc.). Typical network elements include one or more control cards (e.g., XCRP (Cross-Connect Route Processor) cards), one or more line cards, and one or more feature cards (e.g., ASE (Advanced Services Engine) cards, each interconnected via a high speed mesh. A typical network element is logically separated into a data plane (sometimes also referred to as a forwarding plane) and a control plane. In the case that the network element is a router, the control plane typically determines how data (e.g., packets) is routed (e.g., the next hop for the data and the outgoing port for that data), and the data plane forwards that data. In addition, the control plane establishes sessions and maintains those sessions (e.g., by processing control messages received by the data plane). For example, in the case where the network element is providing support for Mobile IP, the control plane establishes Mobile IP sessions and refreshes those established Mobile IP sessions (e.g., by processing binding update messages).

The control plane includes one or more processes and/or daemons communicating with each other, typically through Inter-Process Communication (IPC). IPC supports point-to-point bidirectional communication between processes, and each endpoint for IPC is uniquely identified and monitored by a master process (e.g., a process manager). In addition, the master process (e.g., the process manager) monitors all of the other processes in the control plane and data plane. In addition, the control plane includes one or more data structures related to the services it provides. For example, if the network element is a router or has routing capability, the control plane typically includes a Routing Information Base (RIB). In addition, the control plane typically includes security and/or AAA processes (e.g., Authentication, Authorization, and Accounting).

Typical network element may provide for 1:1 active/standby redundancy for control plane processes. For example, many network elements support dual control cards, where one control card acts as the active controller and the other acts as a hot standby. The active control card synchronizes with the standby control card. The standby control card assumes the role of active control card if the active control card fails. Typically, when acting as a standby control card, the standby control card does not actively perform signaling or process control messages. Other network elements may use a 1:N redundancy model where a single standby control card and/or processor backs up N active control cards and/or processors. Typically, the single standby control card does not actively perform signaling or process control messages.

A network element supports a limited number of cards. For example, the number of cards that may be installed in a network element is typically limited by the number of slots in the chassis of the network element. Since a typical 1:1 active/standby redundancy scheme requires a dedicated standby card for each active card, increasing the number of cards to increase the number of control plane services also increases the number of cards for the redundancy scheme. The addition of cards for redundancy purposes reduces the number of cards that can be used for other purposes (e.g., adding cards for control plane redundancy reduces the number of line cards that may be installed in the network element).

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and with other electronic devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Some network elements are multiple services network elements that provide support for multiple networking functions (e.g., routing, bridging, switching, Layer 2 aggregation, and subscriber management or any combination of routing, bridging, switching, Layer 2 aggregation, and subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network (wired or wirelessly) to edge network elements, which are coupled through one or more core network elements to the server computing end stations.

Some network elements support the configuration of multiple contexts. As used herein, each context includes one or more instances of a virtual network element (e.g., a virtual router, virtual switch, or a virtual bridge). Each context typically shares system resources (e.g., memory, processing cycles, etc.) with other contexts configured on the network element, yet is independently administrable. For example, in the case of multiple virtual routers, each virtual router shares system resources but is separate from other virtual routers regarding its management domain, AAA (authentication, authorization, and accounting) name space, IP address, and routing database(es). Service and/or content providers may employ multiple contexts to provide direct network access for customers and/or provide different classes of services for customers. As another example, in the case of multiple virtual switches, each virtual switch shares system resources but each virtual switch maintains its own forwarding table, which, for example, may be used to map Media Access Control (MAC) addresses to virtual circuits.

A method and apparatus for a hierarchical redundancy scheme for a distributed control plane is described. In one embodiment of the invention, control plane process are distributed among a plurality of processing entities including an active primary control processing entity and multiple secondary processing entities. An application redundancy manager running on the active primary control processing entity manages the redundancy services among the plurality of secondary processing entities, including establishing the redundancy configuration, and handling recovery from a failure.

Figure 1:
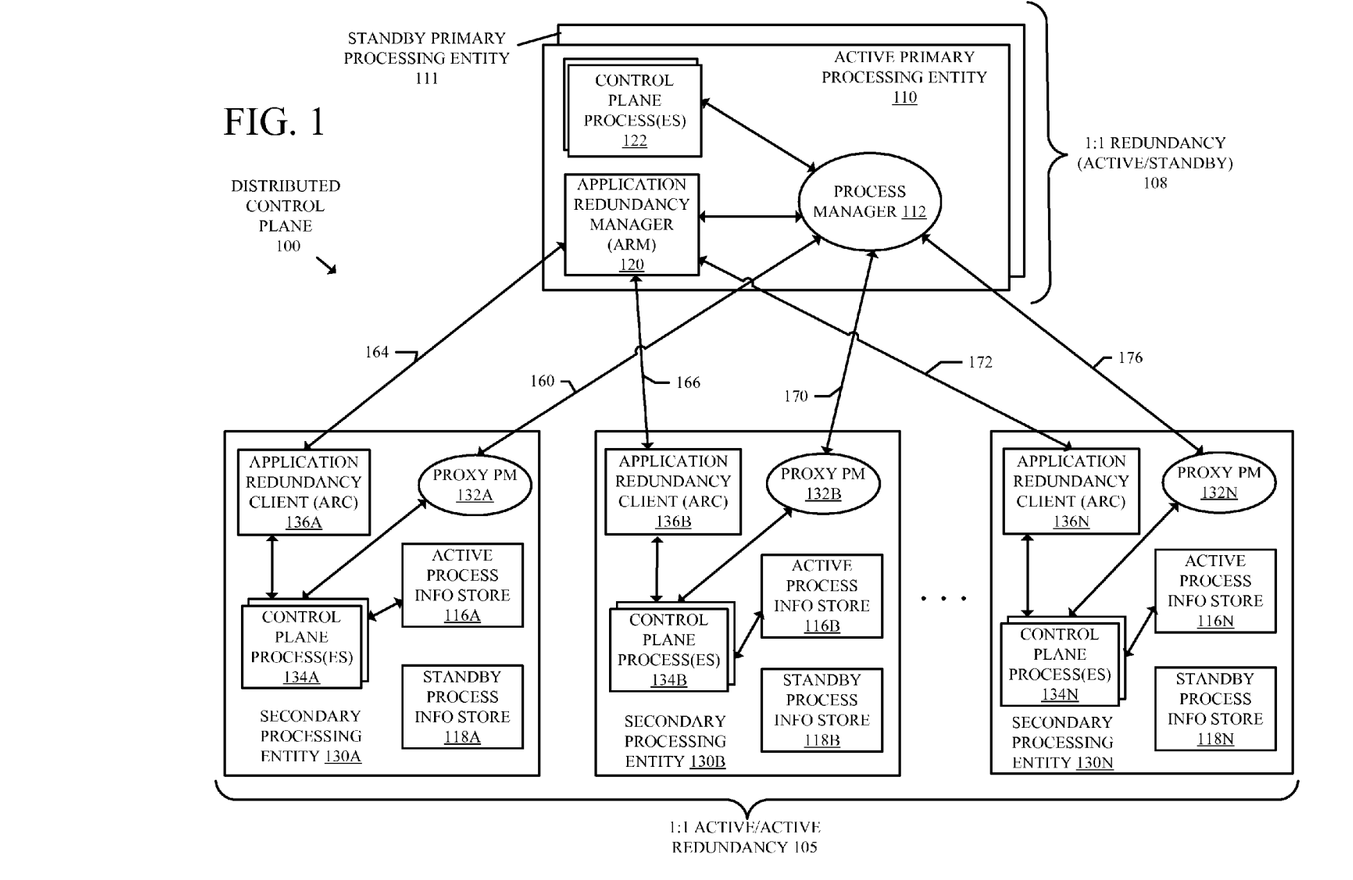
FIG. 1 illustrates an exemplary hierarchical redundancy scheme for a distributed control plane according to one embodiment of the invention.
Figure 9:
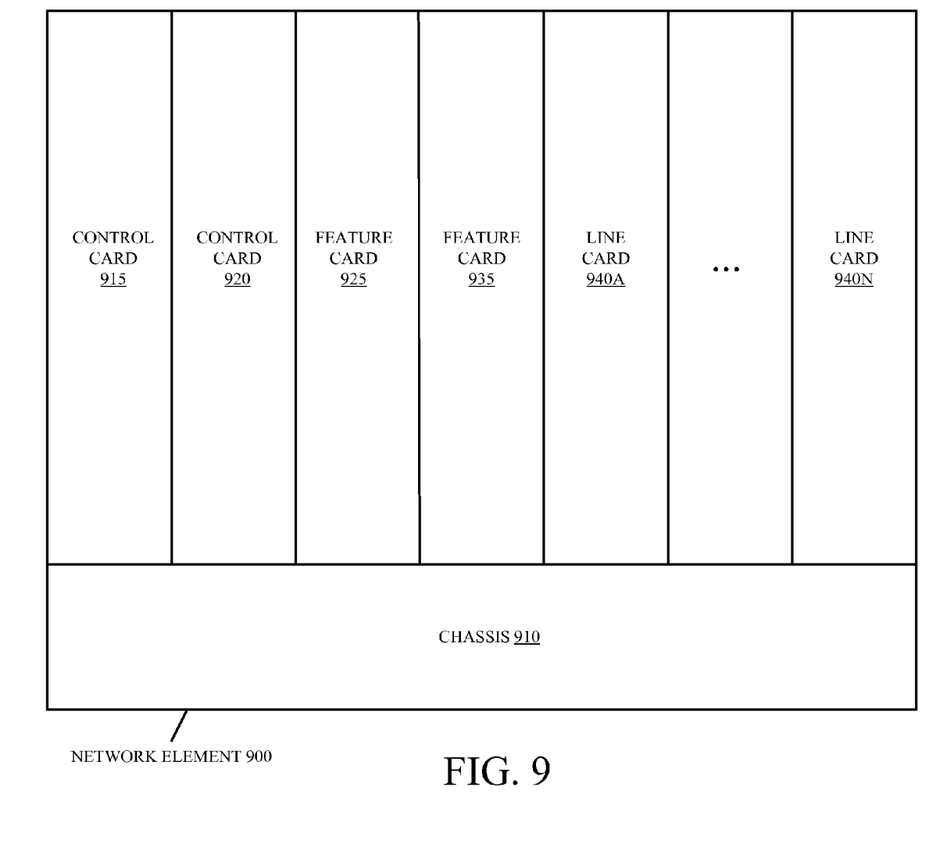
FIG. 9 is a block diagram exemplary illustrating an exemplary network element which may be used in some embodiments of the invention.

FIG. 1 illustrates an exemplary hierarchical redundancy scheme for a distributed control plane according to one embodiment of the invention. According to one embodiment of the invention, the distributed control plane 100 illustrated in FIG. 1 is implemented with the exemplary architecture of the network element 900 illustrated in FIG. 9. However, it should be understood that the architecture illustrated in FIG. 9 is exemplary, and other alternative architectures may be used in alternative embodiments of the invention.

The distributed control plane 100 includes the active primary processing entity 110 (e.g., a control card such as a Cross-Connect Route Processor (XCRP) card) coupled with a standby primary processing entity 111 (the active primary processing entity 110 and the standby primary processing entity 111 are typically coupled via a high speed mesh, which is not shown in FIG. 1 for simplicity purposes). The standby primary processing entity 111 is typically not considered to be an active part of the distributed control plane 100 until the standby primary processing entity 111 is switched over to perform the function of the active primary processing entity 110 (e.g., after a failure of the active primary processing entity 110). As used herein, a processing entity performs processing functions for the distributed control plane 100. For example, processing entities include primary cards (e.g., control cards), secondary cards (e.g., control cards, Advanced Services Engine (ASE) cards, line cards), and processor core(s) on the primary cards and/or secondary cards (e.g., if there are multiple processor cores on a single primary and/or secondary card). Thus, while in one embodiment of the invention the distributed control plane 100 includes multiple cards (e.g., primary control card and one or more secondary control cards), in alternative embodiments of the invention the distributed control plane 100 exists within a single primary control card having multiple processor cores.

According to one embodiment of the invention, the active primary processing entity 110 and the standby primary processing entity 111 are configured in a 1:1 active/standby redundancy scheme 108, where the standby primary processing entity 111 backs up the active primary processing entity 110. In the 1:1 active/standby redundancy scheme, the standby primary processing entity 111 assumes the role as the active primary processing entity if the active primary processing entity 110 fails. However, in alternative embodiments of the invention, the active primary processing entity 110 and the standby primary processing entity 111 are configured in a different redundancy scheme (e.g., the standby primary processing entity 111 may be a part of the 1:1 active/active redundancy scheme 105 that will be described in greater detail later herein).

The active primary processing entity 110 and the standby primary processing entity 111 are coupled with the secondary processing entities 130A-130N via a high-speed mesh (not shown for simplicity purposes). The active primary processing entity 110 and the secondary processing entities 130A-130N communicate with each other, as will be described in greater detail later herein, over the high-speed mesh (the standby primary processing entity 111 typically does not communicate with the secondary processing entities 130A-130N unless acting as the active primary processing entity). In one embodiment of the invention, the secondary processing entities 130A-130N include one or more control cards and/or one or more Advanced Services Engine (ASE) cards (sometimes referred to as 'feature cards'). ASE cards typically support processing of specific applications such as L4L7 services (firewall, IPSec, IDS, P2P), VoIP Session Border Controller, and Mobile Wireless Gateways (GGSN, LTE SAEGW) etc. For example, an ASE card may be used to terminate IPsec tunnels and execute the attendant authentication and encryption algorithms. Additionally, in some embodiments of the invention, the secondary processing entities 130A-130N also include one or more line cards. For example, with reference to FIG. 9, the control card 915 may be the active primary processing entity 110 and the control card 920 may be the standby processing entity 111. In addition, the feature cards 925 and 935 may each be secondary processing entities. Also, in some embodiments of the invention, any or all of the line cards 940A-940N are secondary processing entities. It should also be understood that although the secondary processing entities 130A-130N illustrated in FIG. 1 each participate in the distributed control plane 100 (e.g., they each may host one or more distributed control plane process instances), other secondary processing entities (including control cards, ASE cards, and/or line cards), which are not illustrated in FIG. 1, may be included in the network element and may not participate in the distributed control plane 100.

Each of the processing entities 110, 111, and 130A-130N include one or more, memories, busses, and other well known circuits and structures, which are not illustrated in FIG. 1 in order not to confuse understanding of the invention. Additionally, other well known features of a network element are not illustrated in FIG. 1 in order not to confuse understanding of the invention. It should also be understood that the distributed control plane architecture illustrated in FIG. 1 is an example of an architecture of a distributed control plane, and other, alternative architectures may be used with the embodiments of the invention described herein.

The active primary processing entity 110 includes the process manager 112, the application redundancy manager (ARM) 120, and one or more application control processes 122. It should be understood that processes and/or modules included in the active primary control card 110 are exemplary, and other alternative processes and/or modules may be included in the active primary processing entity 110. In one embodiment of the invention, the active primary processing entity 110 synchronizes its data and processes with the standby processing entity 111. Thus, in this embodiment of the invention, the standby primary processing entity 111 includes a standby process manager, a standby ARM, and standby control plane processes.

In one embodiment of the invention, the process manager 112 monitors and controls the operation of all of the processes running on the primary processing entity 110. For example, the process manager 112 initializes process instances and assigns each process instance a unique process instance identifier. The unique process instance identifier allows the same process to be instantiated multiple times on the same card (e.g., if the card supports SMP (Symmetric Multi-Processing) with multiple processor cores). The unique process instance identifier is used in an IPC endpoint and/or shared memory segment. In addition, the process manager 112 assigns a unique process instance identifier to each distributed process instance.

The process manager 112 communicates with the process instances it is monitoring and controlling. For example, in one embodiment of the invention, the process manager 112 uses Inter-Process Communication (IPC) to communicate with the one or more application control processes 122 and the application redundancy manager 120. The process manager 112 assigns a unique IPC endpoint to each of the processes on the active primary processing entity 110 (thus, each process instance on the active primary processing entity 110 has a unique IPC endpoint for IPC communication). According to one embodiment of the invention, the unique IPC endpoint includes the card slot number and the unique process instance identifier. In one embodiment of the invention, the process manager 112 monitors the status of process instances by transmitting and receiving IPC keepalive messages. For example, during normal operation, the process manager 112 transmits IPC keepalive messages periodically to the process instances (e.g., the one or more application control plane processes 122 and the ARM 120) and receives IPC keepalive messages periodically from those process instances. If the process manager 112 does not receive a keepalive message from a particular process instance in a given time, the process manager 112 may take corrective action (e.g., restart the process instance, start a debugging process instance, etc.).

In some embodiments of the invention, the process manager 112 manages and monitors the secondary processing entities (e.g., the secondary processing entities 130A-130N). For example, in one embodiment of the invention, the process manager determines whether a secondary processing entity has been added to the network element (e.g., with reference to FIG. 9, the process manager 112 determines whether another control card, feature card, and/or line card is added to the chassis 910 of the network element 900). Similarly, the process manager 112 monitors whether a secondary processing entity has failed. The process manager 112 registers each of the secondary processing entities participating in the distributed control plane 100 with the ARM 120.

In one embodiment of the invention, the ARM 120 manages the redundancy of the secondary processing entities 130A-130N. For example, the ARM 120 configures the 1:1 active/active redundancy scheme 105. In addition, the ARM 120 communicates with the secondary processing entities 130A-130N via the application redundancy clients (ARCs) 136A-136N over the lines 164, 166, and 172 respectively (typically over a high speed mesh). An exemplary embodiment of the ARM 120 will be described in greater detail later herein.

Application control plane process(es) are distributed across the secondary processing entities 130A-130N. For example, the secondary processing entities 130A-130N include one or more application control plane processes 134A-134N respectively. In one embodiment of the invention, the process manager 112 distributes particular process instances to particular secondary processing entities 130A-130N.

In one embodiment of the invention, information resulting from the processing of the control plane process(es) 134A-134N is backed up with a 1:1 active/active redundancy scheme 105. For example, the secondary processing entities 130A-130N include the active process information stores 116A-116N and the standby process information store 118A-118N respectively. The active process information stores 116A-116N store control plane process information such as sessions and data generated from the processing of the control plane process(es) 134A-134N respectively (referred to as 'active data'). The standby process information stores 118A-118N store a standby copy of another processing entity's control plane process information (e.g., its active data) in a standby mode (e.g., sessions and data generated from the processing of the control plane process(es) of a different processing entity) (referred to as 'standby data'). The control plane process information stored in the active process information stores 116A-116N is stateful and application specific such that the processing entity storing the standby copy can recreate sessions or other application specific data by processing that data. In addition, each secondary processing entity also acts as an active secondary processing entity for its control plane processes. Thus, each of the secondary processing entities 130A-130N performs dual functions; the first being active control plane processing, and the second being a standby to another active control plane processing entity. Thus, in the 1:1 active/active redundancy scheme 105, there are no secondary processing entities acting solely as a standby. Thus, the addition of a secondary processing entity to the distributed control plane 100 does not require adding a separate standby processing entity. In one embodiment of the invention, the 1:1 active/active redundancy scheme 105 is arranged in a daisy chain format. An example of a daisy-chain 1:1 active/active redundancy scheme will be described in greater detail with reference to FIGS. 5-8.

In addition, in some embodiments of the invention, the process manager 112 distributes a proxy process manager to each of the secondary processing entities participating in the distributed control plane 100. For example, with reference to FIG. 1, the process manager 112 distributes the proxy process managers 132A-132N to the secondary processing entities 130A-130N respectively. In addition, according to one embodiment of the invention, the process manager 112 monitors the status of each of the distributed proxy process managers 132A-132N (e.g., in a similar manner as described above in reference to the local process instances on the primary processing entity 110). Thus, the proxy process managers 132A-132N monitor the status of the application control plane processes 134A-134N respectively (e.g., by sending keep-alive messages). If an application control plane process fails or information related to that control plane process is lost, the proxy process manager may notify the process manager 112 of the failure. Similarly, the process manager 112 periodically transmits keep-alive messages to the proxy process managers 132A-132N (e.g., over the lines 160, 170, and 176 respectively). If the process manager 112 fails to receive a keep-alive message from a particular proxy process manager on a particular secondary processing entity in a given time period, the process manager 112 may determine that the secondary processing entity is no longer participating in the distributed control plane (e.g., due to a hardware and/or software failure).

Figure 3A:
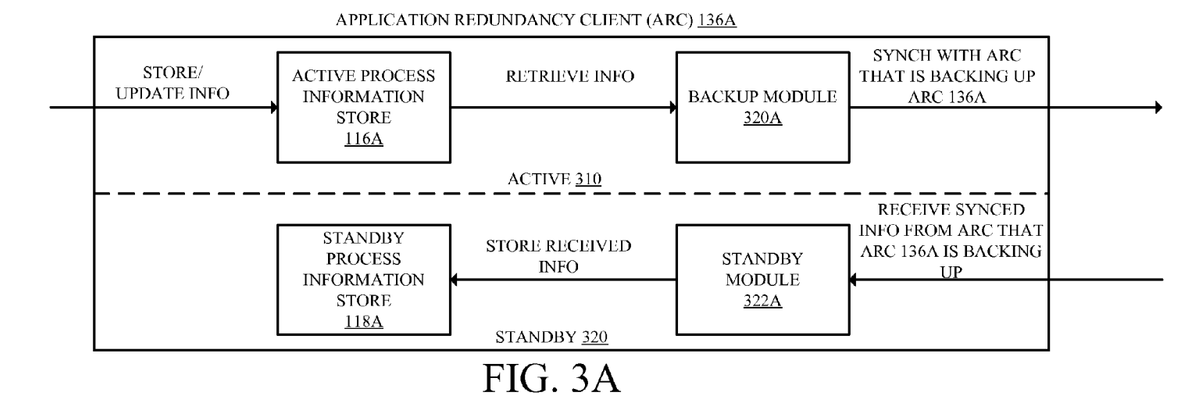
FIGS. 3A and 3B illustrate an exemplary application redundancy client according to one embodiment of the invention.
Figure 3B:
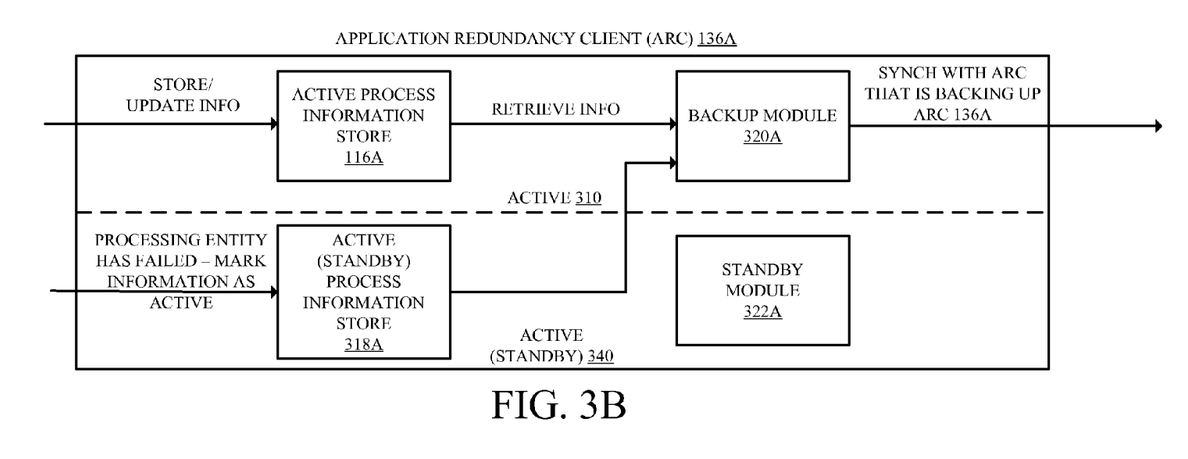

According to one embodiment of the invention, the process manager 112 distributes an application redundancy client (ARC) 136A-136N to the secondary processing entities 130A-130N respectively. In one embodiment of the invention, the ARCs 136A-136N manage the redundancy service (with instructions from the ARM 120) for the secondary processing entities 130A-130N respectively. In one embodiment of the invention, each ARC 136A-136N is logically separated into an active portion and a standby portion. FIGS. 3A and 3B illustrate an exemplary ARC 136A according to one embodiment of the invention. The ARC 136A illustrated in FIG. 3A includes the active portion 310 and the standby portion 320. The active portion 310 includes the active process information store 116A and the backup module 320A. It should be understood that although the active process information store 116A is illustrated within the active portion 310, in alternative embodiments of the invention the active process information store 116A is located outside of the ARC 136A and the active portion 310 accesses the active process information store 116A. The standby portion 320 includes the standby process information store 118A and the standby module 322A. It should be understood that although the standby process information store 118A is illustrated within the standby portion 320, in alternative embodiments of the invention the standby process information store 118A is located outside of the ARC 136A and the standby portion 320 accesses the standby process information store 118A.

According to one embodiment of the invention, application specific information (e.g., application session information) derived from the particular application control plane process(es) 134A is stored in the active process information store 116A. The backup module 320A synchronizes the application specific information stored in the active process information store 116A with another processing entity (e.g., the processing entity acting as a backup of the processing entity 130A). For example, the ARC 136A transmits the information to an ARC on the processing entity(ies) acting as a backup of the processing entity 130A. For example, if the application control plane process(es) on a particular secondary processing entity include support for Evolved Packet System (EPS) (EPS being a network architecture for 4G mobile telephone systems), the active portion may include information related to the sessions created for mobile subscribers, may process control messages relative to the mobile subscribers, etc. In one embodiment of the invention, the ARC 136A marks the application specific information stored in the active process information store 116A as active. According to one embodiment of the invention, if the processing entity 130A fails, or the information stored in the active process information store 116A is lost, the information that was synchronized to another processing entity may be used to recreate the sessions.

The ARC 136A causes application specific information received from another processing entity to be stored in the standby process information store 118A. In one embodiment of the invention, the standby module 322A receives the application specific information from the ARC on the processing entity that the processing entity 130A is backing up. The standby module 322A causes that received information to be stored in the standby process information store 118A. In addition, in one embodiment of the invention, the standby module 322A marks the received information as standby.

FIG. 3B illustrates the ARC 136A reacting to an indication that the processing entity it is backing up has failed. According to one embodiment of the invention, the ARM 120 notifies the ARC 136A that the processing entity that the processing entity 130A is backing up has failed. In response, the ARC 136A marks the application specific information stored in the standby process information store 118A as active (this is illustrated as active (standby) process information store 318A). In one embodiment of the invention, the application specific information transitioned from standby to active (marked as active in the active (standby) process information store 318A) is synched with the processing entity that is currently backing the processing entity 130A.

Figure 2:
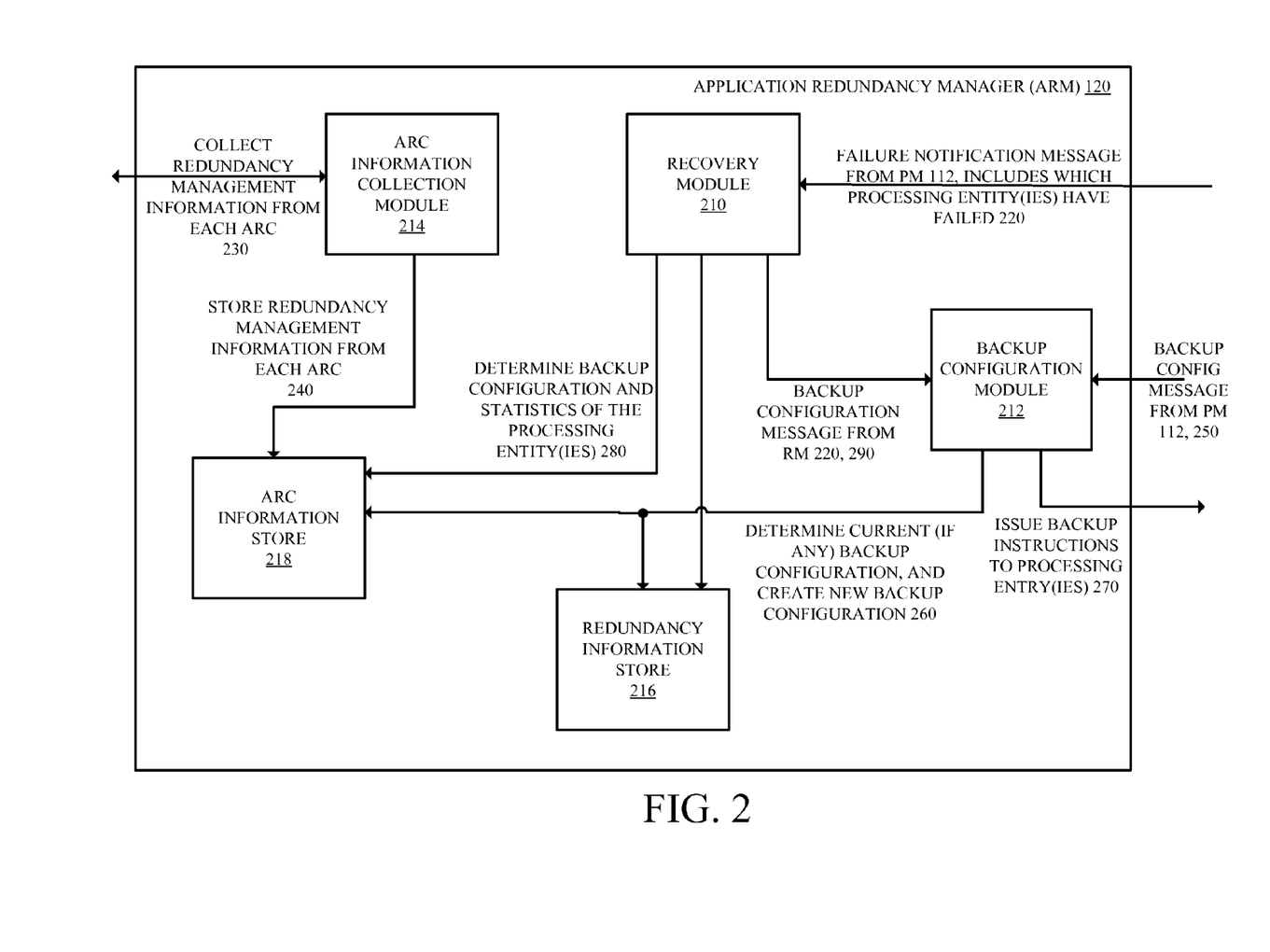
FIG. 2 illustrates an exemplary application redundancy manager according to one embodiment of the invention.

According to one embodiment of the invention, the ARM 120 in the active primary control processing entity 110 manages the redundancy scheme of the secondary processing entities 130A-130N. For example, in a daisy-chain scheme, the ARM 120 selects and designates one of the secondary processing entities 130A-130N as the backup of another one of the secondary cads 130A-130N. For example, FIG. 2 illustrates an exemplary ARM 120 according to one embodiment of the invention. It should be understood that the ARM illustrated in FIG. 2 is an example of an architecture of an ARM, and other, alternative architectures may be used with the embodiments of the invention described herein.

The ARM 120 illustrated in FIG. 2 includes the recovery module 210, the backup configuration module 212, the application redundancy client (ARC) information collection module 214, the redundancy information store 216, and the ARC information store 218. According to one embodiment of the invention, the backup configuration module 212 determines and configures the redundancy scheme of the secondary processing entities 130A-130N. For example, the backup configuration module 212 may receive a backup notification message from the process manager 112 indicating that one or more processing entities have joined the distributed control plane 100 (e.g., those processing entities have been distributed control plane processes and actively perform control plane processing including signaling and control message processing).

Figure 6:
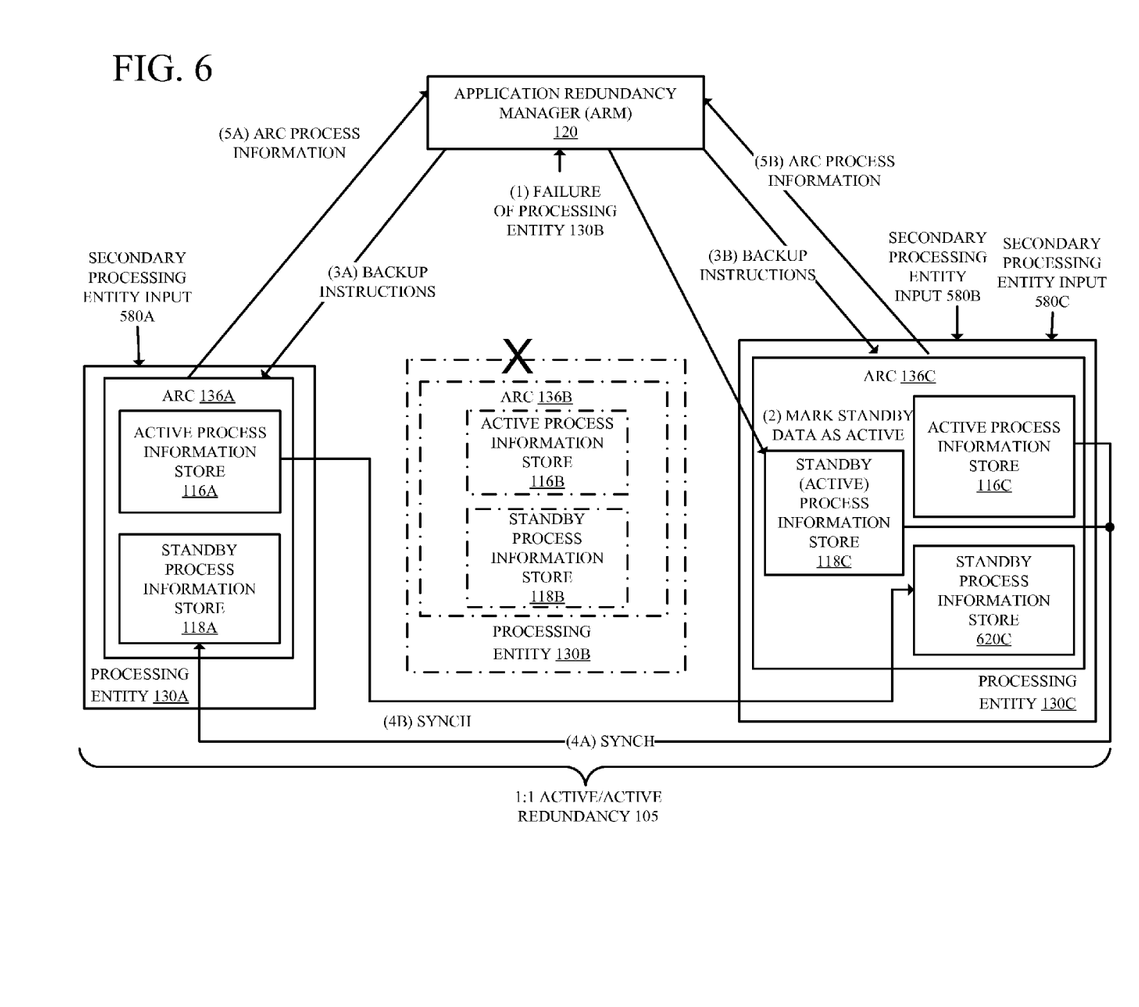
FIG. 6 is a data flow diagram illustrating a processing entity failure in the exemplary daisy-chain 1:1 active/active redundancy scheme illustrated in FIG. 5 according to one embodiment of the invention.
Figure 8:
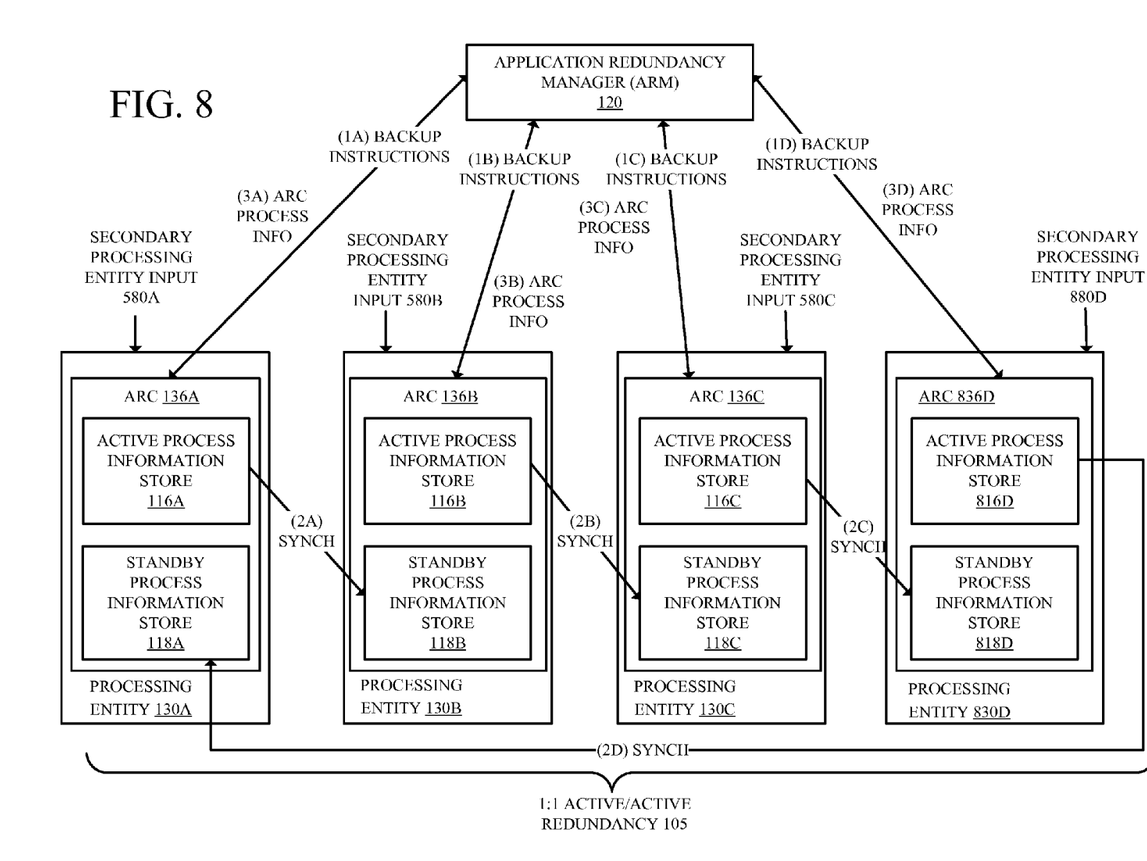
FIG. 8 is a data flow diagram illustrating the addition of a processing entity to the exemplary daisy-chain 1:1 active/active redundancy scheme illustrated in FIG. 5 according to one embodiment of the invention.

For example, in one embodiment of the invention, at system initialization, the process manager 112 notifies the backup configuration module 212 of each processing entity that will participate in the distributed control plane 100 (illustrated in FIG. 2 by the numeral 250). It should also be understood that processing entities may join and/or leave the distributed control plane 100 at times other than system initialization. For example, an additional card (e.g., control card, line card, feature card) may be installed in the network element after the system is running (and after the distributed control plane 100 is established) and that card may be included into the distributed control plane 100. As another example, an existing card and/or processor core, previously not a participant of the distributed control plane 100, may join the distributed control plane 100. FIG. 8 illustrates a processing entity joining an established distributed control plane. In addition, one or more processing entities participating in the distributed control plane 100 may leave (stop participating) in the distributed control plane 100 (e.g., due to a failure of the processing entity, system configuration, etc.). FIG. 6 illustrates a processing entity leaving an established distributed control plane.

Figure 4A:
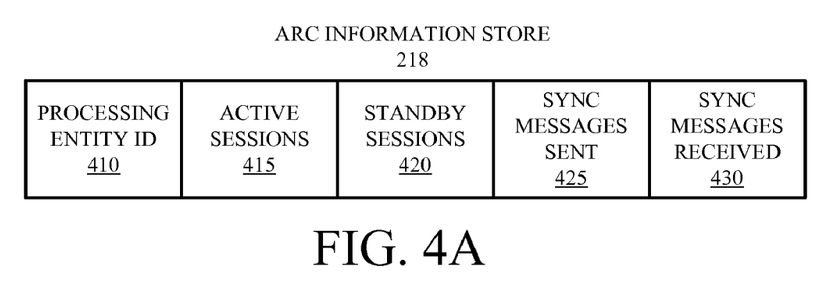
FIG. 4A illustrates the fields of an exemplary application redundancy client information store according to one embodiment of the invention
Figure 4B:
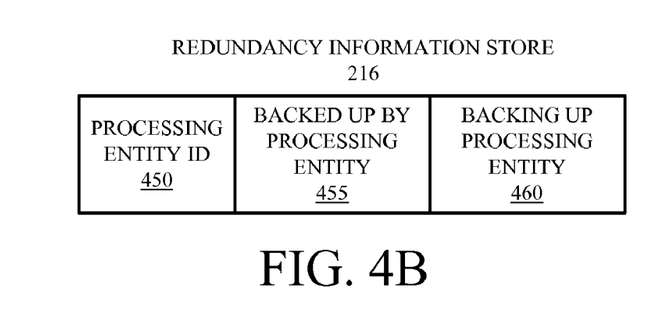
FIG. 4B illustrates the fields of an exemplary redundancy information store according to one embodiment of the invention.

The backup configuration module 212 creates the redundancy scheme for those processing entity(ies) (e.g., the 1:1 active/active redundancy scheme 105). The backup configuration module 212 determines if there is a current backup configuration and the properties of such a backup configuration from accessing the redundancy information store 216 (illustrated with the numeral 260). For example, FIG. 4B illustrates the fields of an exemplary redundancy information store 216 according to one embodiment of the invention. It should be understood that the fields illustrated in FIG. 4B are exemplary, and other, alternative and/or additional fields may be used with the embodiments of the invention described herein. The redundancy information store 216, as illustrated in FIG. 4B, includes the following fields: processing entity identifier 450, backed up by processing entity 455 and backing up processing entity 460.

After determining the current backup configuration (if any exists), the backup configuration module 112 creates a backup configuration with the participating secondary processing entities. For example, in one embodiment of the invention, the backup configuration module 212 creates the 1:1 active/active redundancy scheme 105 in a daisy chain format. For example, to create a daisy-chain 1:1 active/active redundancy scheme, the backup configuration module 212 creates a circular linked-list from each secondary processing entity participating in the distributed control plane 100. The backup configuration module 212 begins at a first entry in the circular linked-list (e.g., a first one of the secondary processing entities) and designates the 'next' entry as the backup of the first entry. This process continues until each secondary processing entity is both backed up by a different secondary processing entity and is backing up a secondary processing entity. The backup configuration module 212 records the backup configuration in the redundancy information store 216. Sometime after the backup configuration module 212 determines the backup configuration, the backup configuration module 212 issues backup instructions to the ARCs of the secondary processing entity(ies), as indicated by the numeral 270. The ARCs use the backup instructions to determine which processing entity(ies) are being backed up and the processing entity(ies) they are backing up.

In one embodiment of the invention, the ARCs communicate redundancy management information to the ARM 120. For example, the ARC information collection module 214 collects redundancy management information from each of the ARCs (as indicated by numeral 230). As indicated by the numeral 240, the collection module 214 stores the redundancy management information into the ARC information store 218. FIG. 4A illustrates the fields of an exemplary ARC information store 218 according to one embodiment of the invention. The ARC information store 218, as illustrated in FIG. 4A, includes the following fields: processing entity identifier 410, the number of active sessions 415, the number of standby sessions 420, the number of sync messages sent 425, and the number of sync messages received 430. It should be understood that the fields illustrated in FIG. 4A are exemplary, and other, alternative and/or additional fields may be used with the embodiments of the invention described herein. Thus, rather then each of the ARCs reporting statistical information to each other and managing that information, in some embodiments of the invention the ARCs each reports its state to the ARM 120. This reduces the communication between the secondary processing entities as well as removing the redundancy management operations from the secondary processing entities. In addition, since the ARM has statistical information related to each secondary processing entity, upon a failure of a secondary processing entity, the ARM may quickly cause a recovery to occur and quickly reconfigure the redundancy scheme without the other secondary processing entities reacting to the failure (with the exception of performing instructions as indicated by the ARM).

Figure 5:
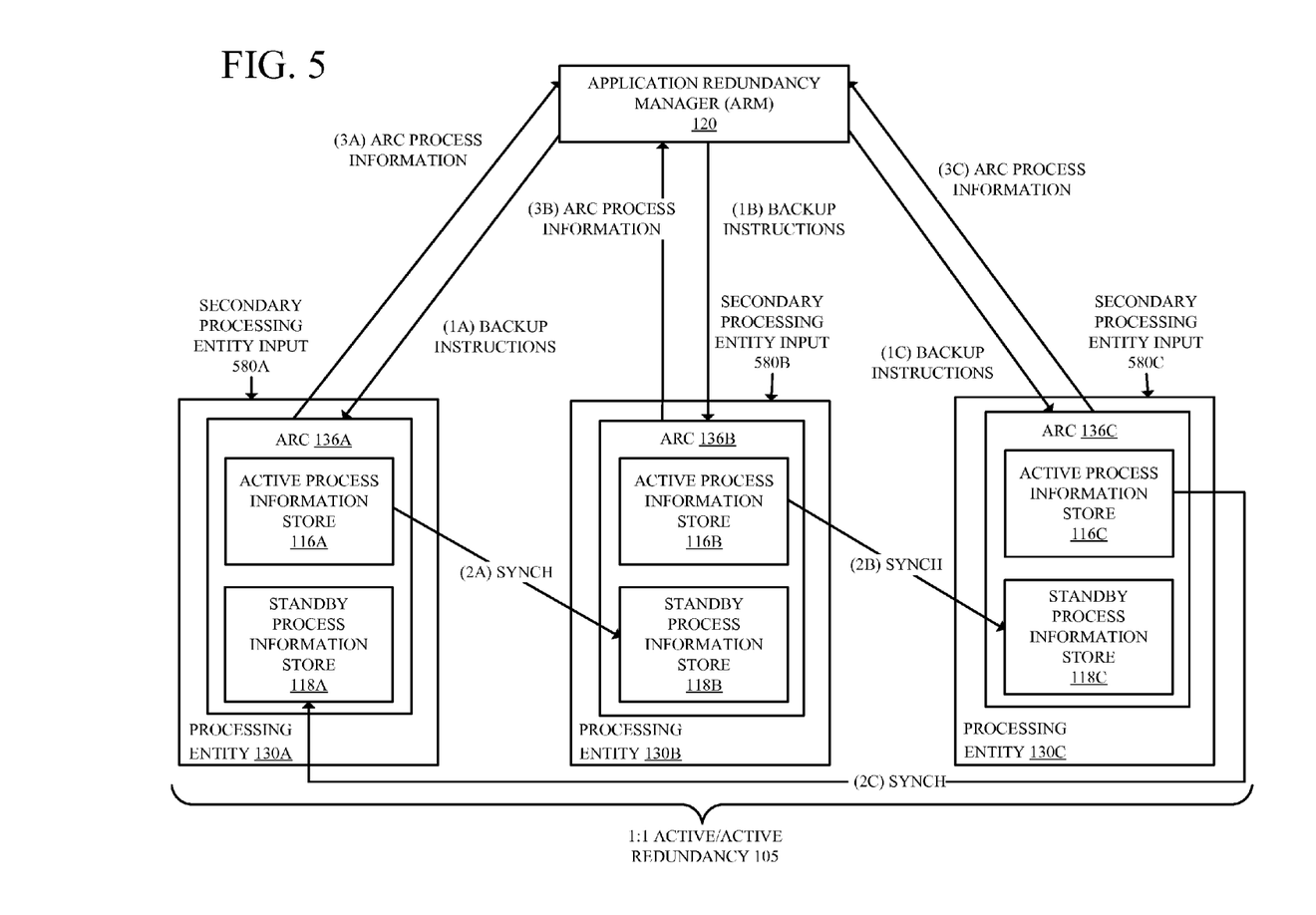
FIG. 5 is a data flow diagram illustrating an exemplary daisy-chain 1:1 active/active redundancy scheme according to one embodiment of the invention.

FIG. 5 is a data flow diagram illustrating an exemplary daisy-chain 1:1 active/active redundancy scheme 105 for secondary processing entities. FIG. 5 illustrates three processing entities (130A, 130B, and 130C) in the active/active redundancy scheme 105. Thus, for illustrative purposes, the number of secondary processing entities participating in the distributed control plane 100 is three. However, it should be understood that this number is illustrative, as more or less secondary processing entities may participate in the distributed control plane and be a part of the active/active redundancy scheme 105 (e.g., up to N secondary processing entities may participate in the active/active redundancy scheme). Each of the processing entities 130A, 130B, and 130C performs a dual role; an active role and a standby role. In its active role, a processing entity performs control plane services in accordance with its distributed control plane processes (e.g., signaling, control message processing, etc.), and stores and maintains sessions and data relevant to those control plane services (referred to as active data). In its standby role, a processing entity stores and maintains sessions and data relevant to those control plane services (referred to as standby data) in standby mode. The processing entities 130A, 130B, and 130C process the secondary processing entity inputs 580A, 580B, and 580C respectively. The secondary processing entity inputs include signaling requests and/or control plane message processing, etc. The processing entities 130A, 130B, and 130C include the ARCs 136A, 136B, and 136C respectively. In addition, the processing entities 130A, 130B, and 130C include the active process information stores 116A, 116B, and 116C, and the standby process information stores 118A, 118B, and 118C, respectively. The active process information stores 116A, 116B, and 116C store information such as sessions and data relevant to the control plane process(es) 134A, 134B, and 134C respectively; the information resulting from the processing of the secondary processing entity inputs 580A, 580B, and 580C respectively (the active data). The standby process information stores 118A, 118B, and 118C stores a standby copy (e.g., sessions and data relevant to particular control plane process(es) and recreated in standby mode). Specifically, the standby process information store 118A stores a standby copy of the active data of the processing entity 130C, the standby process information store 118B stores a standby copy of the active data of the processing entity 130A, and the standby process information store 118C stores a standby copy of the active data of the processing entity 130B.

At operations 1A, 1B, and 1C, the ARM 120 issues backup instructions to the ARCs 136A, 136B, and 136C respectively. The backup instructions indicate that the processing entity 130A will back up the processing entity 130C, the processing entity 130B will back up the processing entity 130A, and the processing entity 130C will back up the processing entity 130B. In addition, the backup instructions indicate that the processing entity 130A will be backed up by the processing entity 130B, the processing entity 130B will be backed up by the processing entity 130C, and the processing entity 130C will be backed up by the processing entity 130A.

The ARCs 136A, 136B, and 136C process the backup instructions and synchronize their active data. For example, at operation 2A, the ARC 136A causes the information stored in the active process information store 116A to be synchronized to the standby process information store 118B. At operation 2B, the ARC 136B causes the information stored in the active process information store 116B to be synchronized to the standby process information store 118C. At operation 2C, the ARC 136C causes the information stored in the active process information store 116C to be synchronized to the standby process information store 118A.

According to one embodiment of the invention, the data synchronized between an active process information store and a standby process information store is stateful and application specific. The transport mechanism may vary between different embodiments of the invention, including using IPC (Inter-Process Communication), shared memory, and Internet Protocol based transport (e.g., TCP, UDP, SCTP). The active data is stateful such that the processing entity storing the standby copy can recreate sessions (or other application specific data) by processing that data (e.g., recreate a session on the standby processing entity). In some embodiments of the invention, the processing entity receiving the stateful data may recreate sessions in hot-standby state. Synchronization may be triggered by certain events (e.g., if the information in the active process information store changes) and/or by periodic timers. In addition, in some embodiments of the invention a single session may be synchronized and/or multiple sessions may be synchronized with a single synchronization message. In addition, the ARM may force bulk synchronization (i.e., multiple session synchronization) between processing entities (e.g., when the redundancy scheme changes (e.g., a processing entity fails or leaves the distributed control plane)).

At operations 3A, 3B, and 3C, the ARCs 136A, 136B, and 136C transmit ARC process information to the ARM 120 respectively. For example, the ARC process information includes the number of active session, the number of redundant sessions, the number of synchronization messages sent, and the number of synchronization messages received. It should be understood that additional and/or alternative information may be transmitted to the ARM, including the processing load of the processing entity, memory load of the processing entity, etc. Collectively, the ARC process information indicates to the ARM 120 the amount of work the processing entity is performing and the redundancy status.

FIG. 6 is a data flow diagram illustrating a processing entity failure in the exemplary daisy-chain 1:1 active/active redundancy scheme illustrated in FIG. 5 according to one embodiment of the invention. In FIG. 6, the processing entity 130B has failed (represented by the dotted-dashed line and the large 'X'). It should be understood that the failure may be caused by numerous reasons and/or factors (e.g., hardware failure, software failure, the processing entity was physically removed from the system, etc.). In addition, it should be understood that in some embodiments of the invention, the failure may be localized to the loss of information in the active process information store 116B (e.g., the information in the active process information store 116B may have been inadvertently lost).

Figure 7:
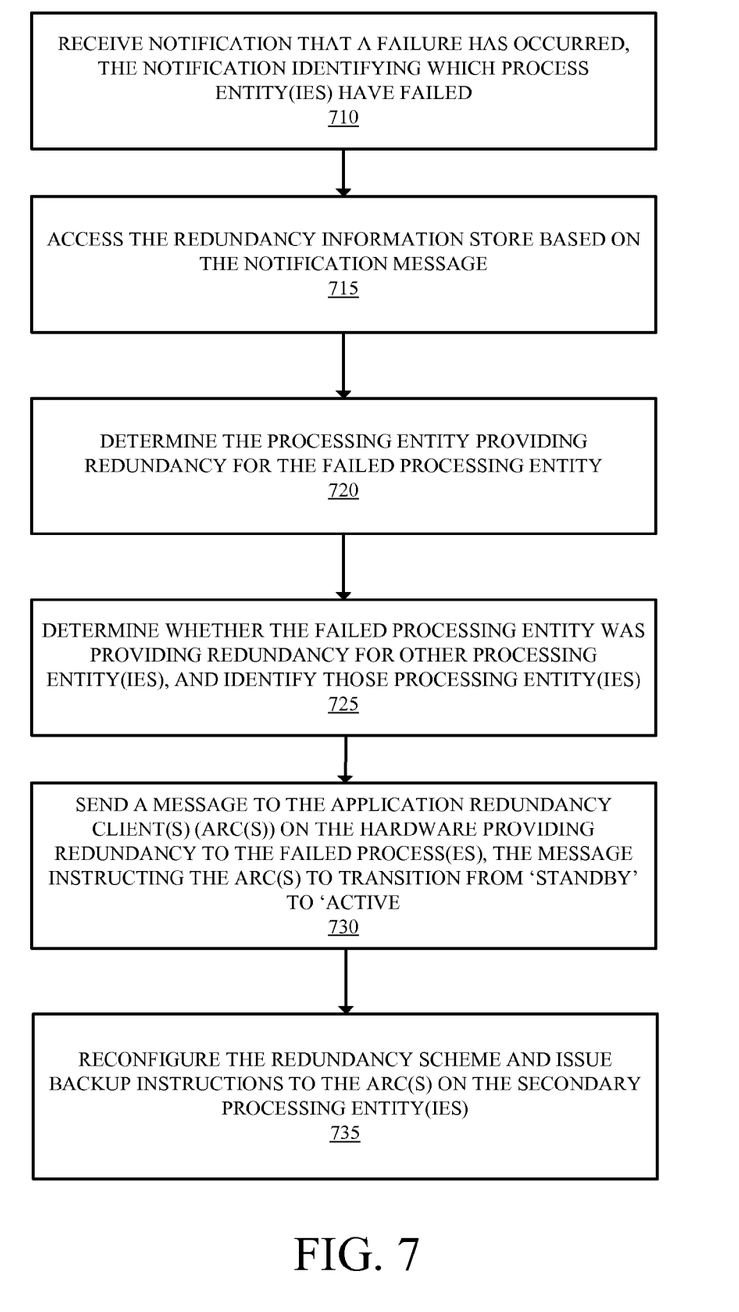
FIG. 7 is a flow diagram illustrating operations performed upon a processing entity failure according to one embodiment of the invention.

The operations of FIG. 6 will be described with reference to the exemplary operations of FIG. 7. However, it should be understood that the operations of FIG. 6 can be performed by embodiments of the invention other than those discussed with reference to FIG. 7, and the embodiments discussed with reference to FIG. 7 can perform operations different than those discussed with reference to FIG. 6. FIG. 7 is a flow diagram illustrating reconfiguring the redundancy scheme upon a failure of a processing entity according to one embodiment of the invention. In one embodiment of the invention, the ARM 120 performs the operations illustrated in FIG. 7.

At operation 1, the ARM 120 is notified of the failure of the processing entity 130B. With reference to FIG. 7, at block 710, the ARM 120 receives a notification that a failure has occurred, and flow moves to block 715. The notification identifies which process entity(ies) have failed. For example, in one embodiment of the invention, the process manager detects when a processing entity has failed. For example, with reference to FIG. 1, the process manager 112 periodically transmits keep-alive messages (e.g., through IPC and/or shared memory segments) to the proxy process managers 132A-132N. If the process manager 112 does not receive a keep-alive message from one of those proxy process managers, the process manager 112 declares a failure of that processing entity and notifies the ARM 120 of the failure of that processing entity. With reference to FIG. 2, the recovery module 210 receives the failure notification message from the PM 112, as indicated by numeral 220.

After receiving the failure notification message, the recovery module 210 determines the current backup configuration and the current backup statistics of the processing entities (as indicated by numeral 280). For example, with reference to FIG. 7, at block 715, the ARM 120 accesses the redundancy information store (e.g., the redundancy information store 216) based on the notification message to locate the entry(ies) for those failed processing entity(ies) (e.g., the processing entity 130B). Flow moves from block 715 to block 720, where the ARM 120 determines the processing entity providing redundancy for the failed processing entity. With reference to FIG. 6, the processing entity 130C is providing redundancy for the failed processing entity 130B. Flow moves from block 720 to block 725, where the ARM determines whether the failed processing entity was providing redundancy for other processing entity(ies) and identifies those processing entities. With reference to FIG. 6, the failed processing entity 130B was providing redundancy for the processing entity 130A.

Flow moves from block 725 to block 730, where the ARM transmits a message to the ARC of the processing entity backing up the data of the failed processing entity. The message instructs the ARC to transition the data/sessions from a 'standby' state to an 'active' state. With reference to FIG. 6, at operation 2, the ARM 120 instructs the ARC 136C to transition the processing entity's standby data/sessions (e.g., the data stored in the standby process information store 118C) as active. For example, the hot-standby sessions previously recreated on the processing entity 130C are now active. Note that sometime after the transition, the secondary processing entity input 580B is directed to the processing entity 130C. Thus, the secondary processing entity inputs 580B and 580C are each directed to the processing entity 130C. Thus, after the failure of the processing entity 130B, in addition to performing the control plane services associated with the secondary processing entity input 580C, the processing entity 130C performs the control plane services of the processing entity 130B.

Flow moves from block 730 to block 735, where the ARM reconfigures the redundancy scheme and issues a backup instruction to each of the ARCs in the 1:1 active/active redundancy scheme 105. For example, with reference to FIG. 6, at operations 3A and 3B, the ARM 120 issues a backup instruction to the ARCs 136A and 136C respectively. The backup instruction transmitted to the ARC 136A indicates that it is to be backed up by the processing entity 130C, and it is to back up the processing entity 130C. The backup instruction transmitted to the ARC 136C indicates that it is to be backed up by the processing entity 130A and that it is to back up the processing entity 130A. At operation 4A, the ARC 136C transmits a synchronization message(s) to the ARC 136A synchronizing its active data (e.g., the data in the active process information store 116C and the data in the standby (active) process information store 118C) with the processing entity 130A (e.g., the processing entity 130A stores the active data of the processing entity 130C in the standby process information store 118A). At operation 4B, the ARC 136A transmits a synchronization message(s) to the ARC 136C synchronizing its active data (e.g., the data in the active process information store 116A) with the processing entity 130C (e.g., the processing entity 130C stores the active data of the processing entity 130A in the standby process information store 620C). Alternatively, since the processing entity 130C is a new backup entity for the processing entity 130A, the ARC 136A may start a bulk-sync to the processing entity 130C. At operations 5A and 5B, the ARCs 136A, and 136C transmit ARC process information to the ARM 120 respectively.

FIG. 8 is a data flow diagram illustrating the addition of a processing entity to the exemplary daisy-chain 1:1 active/active redundancy scheme illustrated in FIG. 5 according to one embodiment of the invention. The processing entity 830D has been added to the 1:1 active/active redundancy scheme 105. The processing entity 830D includes the ARC 836D, the active process information store 816D, and the standby process information store 818D. In addition, the processing entity 830D receives the secondary processing entity input 880D. At operations 1A, 1B, 1C, and 1D, the ARM 120 transmits backup instructions to the ARCs 136A, 136B, 136C, and 836D respectively. The backup instruction transmitted to the ARC 136C indicates that the processing entity 130C is to be backed up by the newly added processing entity 830D (as illustrated in FIG. 5, the processing entity 130C was previously backed up by the processing entity 130A). The backup instruction transmitted to the ARC 836D indicates that the processing entity 830D is to be backed up by the processing entity 130A, and it is to back up the processing entity 130C. At operations 2A, 2B, 2C, and 2D, the processing entities 130A, 130B, 130C, and 830D synchronize their respective active data with the processing entities 130B, 130C, 830D, and 130A respectively. At operations 3A, 3B, 3C, and 3D, the ARCs 136A, 136B, 136C, and 836D transmit ARC process information to the ARM 120 respectively.

Thus, the processing entity 830D has been added to the distributed control plane 100 and is added into the 1:1 active/active redundancy scheme 105, without adding a separate standby processing entity. Thus, for example, the addition of the processing entity 830D increases the control plane session capacity (e.g., the number of EPS subscribers) the network element supports without requiring a separate dedicated standby processing entity for redundancy. Thus, with embodiments of the invention, scalability of adding the amount of and/or type of control plane services to the network element is improved.

FIG. 9 is a block diagram exemplary illustrating an exemplary network element which may be used in some embodiments of the invention. The network element 900 includes the control cards 915 and 920, the feature cards 925 and 935, and the line cards 940A-940N, each coupled with the chassis 910. While in one embodiment of the invention the chassis 910 is coupled to the control cards 915 and 920, the feature cards 925 and 935, and the line cards 940A-940N, in alternative embodiments of the invention multiple other devices and/or modules are coupled to the chassis 910. While in one embodiment of the invention the distributed control plane includes the control cards 915 and 920, the feature cards 925 and 935, and the line cards 940A-940N, alternative embodiments of the invention may have alternate card arrangements (e.g., a combined line and control card with one or more ports and a forwarding engine, one control card per line card, multiple feature cards per line cards, etc.).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for hierarchical redundancy in a distributed control plane of a network element, wherein the distributed control plane includes a plurality of control plane process instances instantiated onto a plurality of processing entities including a primary active processing entity and a plurality of secondary processing entities, the method comprising:
    registering the plurality of processing entities with an application redundancy manager (ARM) instantiated on the primary processing entity;
    for each of the secondary processing entities, the ARM selecting one of the plurality of secondary processing entities to act as a backup for another one of the plurality of secondary processing entities, and the ARM causing its control plane process information to be synchronized between those secondary processing entities;
    collecting redundancy management information from each of the secondary processing entities;
    responsive to detecting a failure of one of the secondary processing entities, performing the following:
        determining, using the collected redundancy management information, which one or more of the plurality of secondary processing entities is backing up the failed secondary processing entity, and
        transitioning the one or more of the plurality of secondary processing entities backing up the failed secondary processing entity to an active state for the backed up control plane process information of the failed secondary processing entity;
    detecting an addition of another secondary processing entity to the distributed control plane;
    selectively distributing control plane process instances to the added secondary processing entity; and
    the ARM selecting one of the plurality of secondary processing entities to act as a backup for the added secondary processing entity, and selecting one of the plurality of secondary processing entities for the added secondary processing entity to backup.

2. The method of claim 1, wherein each secondary processing entity includes an active portion and a standby portion, wherein the active portion includes signaling and control message processing functionality and the standby portion stores control plane process information from a different processing entity.

3. The method of claim 1, wherein the active primary processing entity is backed up by a standby primary secondary processing entity in a 1:1 active/standby redundancy scheme.

4. The method of claim 1, wherein the redundancy management information includes an indication of the number of active sessions for that secondary processing entity and an indication of the number of standby sessions for that secondary processing entity.

5. The method of claim 1, wherein the active primary processing entity is a control card or a processor core on the control card, and at least one of the plurality of the secondary processing entities is a feature card or a processor core on that feature card.

6. The method of claim 1, wherein the secondary processing entities are backed up with a 1:1 active/active redundancy scheme.

7. The method of claim 6, wherein the 1:1 active/active redundancy scheme is a daisy chain.

8. A network element providing hierarchical redundancy for a distributed control plane, the network element comprising:
    an active primary processing entity including:
        a process manager to distribute one or more distributed control plane process instances and a proxy process manager to each of a plurality of secondary processing entities of the network element, the process manager further to detect and notify an application redundancy manager (ARM) when a secondary processing entity is added to the distributed control plane and selectively distribute one or more control plane process instances to the added secondary processing entities;
        the ARM to select, for each of the plurality of secondary processing entities, one of the plurality of secondary processing entities to act as a backup for another one of the plurality of secondary processing entities, the ARM to transmit backup instructions to each of the plurality of secondary processing entities, wherein the ARM is to select one of the plurality of secondary processing entities to act as a backup for each secondary processing entity that is added to the distributed control plane and is to select one of the plurality of secondary processing entities for each of those added secondary processing entities to backup; and
    the plurality of secondary processing entities coupled with the primary processing entity, each of the plurality of secondary processing entities including an application redundancy client (ARC) and the one or more distributed control plane process instances, wherein each of the ARCs is to receive a backup instruction from the ARM and synchronize its active data with another one of the ARCs as directed by the backup instruction, wherein each secondary processing entity is to perform as an active secondary processing entity and as a standby processing entity for another one of the active secondary processing entities, and wherein each secondary processing entity is to store active data and a standby copy of active data of another secondary processing entity.

9. The network element of claim 8, further comprising a standby primary processing entity, wherein the active primary processing entity further to synchronize its data with the standby primary processing entity in a 1:1 active/standby redundancy scheme.

10. The network element of claim 8, wherein the secondary processing entities are configured in a 1:1 active/active daisy-chain redundancy scheme.

11. The network element of claim 8, further comprising the process manager to transmit keep-alive messages to each of the proxy process managers and to detect failures of the secondary processing entities.

12. The network element of claim 11, further comprising the process manager to notify the ARM of a failure of a secondary processing entity, the ARM to receive the notification and determine which of the secondary processing entities is backing up the failed secondary processing entity and instruct the ARC of that secondary processing entity to transition the standby copy of active data to active data.

13. A machine-readable non-transitory storage medium that provides instructions that, if executed by a processor, will cause said processor to perform operations for hierarchical redundancy in a distributed control plane of a network element, wherein the distributed control plane includes a plurality of control plane process instances instantiated onto a plurality of processing entities including a primary active processing entity and a plurality of secondary processing entities, comprising:

registering the plurality of processing entities with an application redundancy manager (ARM) instantiated on the primary processing entity;

for each of the secondary processing entities, the ARM selecting one of the plurality of secondary processing entities to act as a backup for another one of the plurality of secondary processing entities, and the ARM causing control plane process information to be synchronized between those secondary processing entities;

collecting redundancy management information from each of the secondary processing entities;

responsive to detecting a failure of one of the secondary processing entities, performing the following:

determining, using the collected redundancy management information, which one or more of the plurality of secondary processing entities is backing up the failed secondary processing entity, and transitioning the one or more of the plurality of secondary processing entities backing up the failed secondary processing entity to an active state for the backed up control plane process information of the failed secondary processing entity;

detecting an addition of another secondary processing entity to the distributed control plane;

selectively distributing control plane process instances to the added secondary processing entity; and the ARM selecting one of the plurality of secondary processing entities to act as a backup for the added secondary processing entity, and selecting one of the plurality of secondary processing entities for the added secondary processing entity to backup.

14. The machine-readable non-transitory storage medium of claim 13, wherein each secondary processing entity includes an active portion and a standby portion, wherein the active portion includes signaling and control message processing functionality and the standby portion stores control plane process information from a different processing entity.

15. The machine-readable non-transitory storage medium of claim 13, wherein the active primary processing entity is backed up by a standby primary processing entity in a 1:1 active/standby redundancy scheme.

16. The machine-readable non-transitory storage medium of claim 13, wherein the redundancy management information includes an indication of the number of active sessions for that secondary processing entity and an indication of the number of standby sessions for that secondary processing entity.

17. The machine-readable non-transitory storage medium of claim 13, wherein the active primary processing entity is a control card or a processor core on the control card, and at least one of the plurality of the secondary processing entities is a feature card or a processor core on that feature card.

18. The machine-readable non-transitory storage medium of claim 13, wherein the secondary processing entities are backed up with a 1:1 active/active redundancy scheme.

19. The machine-readable storage medium of claim 18, wherein the 1:1 active/active redundancy scheme is a daisy chain.

* * * * *

UNITED STATES PATENT AND TRADEMARK OFFICE
CERTIFICATE OF CORRECTION

| | | |
|---|---|---|
| PATENT NO. | : 7,894,334 B2 | Page 1 of 1 |
| APPLICATION NO. | : 12/192674 | |
| DATED | : February 22, 2011 | |
| INVENTOR(S) | : Wen et al. | |

It is certified that error appears in the above-identified patent and that said Letters Patent is hereby corrected as shown below:

In Column 9, Line 13, delete "cads" and insert -- cards --, therefor.

In Column 18, Line 27, in Claim 19, after "machine-readable", insert -- non-transitory --.

Signed and Sealed this
Seventeenth Day of May, 2011

David J. Kappos
*Director of the United States Patent and Trademark Office*